United States Patent
Uselton et al.

(10) Patent No.: US 9,184,592 B2
(45) Date of Patent: Nov. 10, 2015

(54) UTILITY-INTERACTIVE INVERTER SYSTEM ARCHITECTURE AND METHOD OF OPERATION THEREOF

(75) Inventors: Robert B. Uselton, Plano, TX (US); Timothy J. Brizendine, Caddo Mills, TX (US)

(73) Assignee: Lennox Industries Inc., Richardson, TX (US)

( * ) Notice: Subject to any disclaimer, the term of this patent is extended or adjusted under 35 U.S.C. 154(b) by 457 days.

(21) Appl. No.: 12/641,154

(22) Filed: Dec. 17, 2009

(65) Prior Publication Data

US 2010/0127572 A1     May 27, 2010

Related U.S. Application Data

(63) Continuation-in-part of application No. 12/186,132, filed on Aug. 5, 2008.

(60) Provisional application No. 61/224,530, filed on Jul. 10, 2009, provisional application No. 61/250,736, filed on Oct. 12, 2009.

(51) Int. Cl.
| | |
|---|---|
| H02J 1/00 | (2006.01) |
| H02J 3/38 | (2006.01) |
| F04D 25/02 | (2006.01) |
| F04D 25/06 | (2006.01) |
| F04D 25/08 | (2006.01) |

(52) U.S. Cl.
CPC ............... *H02J 3/38* (2013.01); *F04D 25/022* (2013.01); *F04D 25/06* (2013.01); *F04D 25/08* (2013.01); *Y10T 307/696* (2015.04)

(58) Field of Classification Search
CPC ............. H02J 9/062; H02J 9/061; H02J 7/35; Y02E 10/542
See application file for complete search history.

(56) References Cited

U.S. PATENT DOCUMENTS

| | | |
|---|---|---|
| 3,960,322 A | 6/1976 | Ruff et al. |
| 4,018,581 A | 4/1977 | Ruff et al. |

(Continued)

FOREIGN PATENT DOCUMENTS

| | | |
|---|---|---|
| CN | 1627621 A | 6/2005 |
| JP | 2000314752 A | 11/2000 |

(Continued)

OTHER PUBLICATIONS

Uselton; U.S. Appl. No. 12/186,132; "Dual-Powered Airflow Generator"; filed Aug. 5, 2008.

(Continued)

*Primary Examiner* — Jared Fureman
*Assistant Examiner* — Alfonso Perez Borroto
(74) *Attorney, Agent, or Firm* — R. Johnston Law, PLLC

(57) ABSTRACT

Electrically powered equipment and a method of powering the equipment. In one embodiment, the equipment includes: (1) an electric power consuming apparatus, (2) a mains input coupled to the apparatus and configured to be coupled to a branch circuit extending from a distribution panel and allow electric power from the branch circuit to flow to the apparatus and (3) a grid-tied power source input at least intermittently couplable to the mains input and configured to receive electric power from at least one premises power source and allow the electric power to flow to the apparatus or the distribution panel. In a more specific embodiment, the equipment is an outdoor unit.

18 Claims, 4 Drawing Sheets

(56) References Cited

U.S. PATENT DOCUMENTS

| | | | |
|---|---|---|---|
| 4,742,291 A * | 5/1988 | Bobier et al. | 320/101 |
| 5,452,710 A * | 9/1995 | Palmer | 126/572 |
| 5,493,155 A * | 2/1996 | Okamoto et al. | 307/45 |
| 5,826,435 A | 10/1998 | Hange | |
| 5,835,383 A * | 11/1998 | Onizuka et al. | 700/297 |
| 6,244,062 B1 * | 6/2001 | Prado | 62/235.1 |
| 7,310,966 B2 | 12/2007 | Wagner | |
| 7,626,283 B1 * | 12/2009 | Baucum et al. | 307/23 |
| 2002/0017110 A1 * | 2/2002 | Chiu et al. | 62/305 |
| 2002/0144503 A1 * | 10/2002 | Merswolke et al. | 60/398 |
| 2004/0206813 A1 * | 10/2004 | Brobeck | 235/380 |
| 2004/0254654 A1 * | 12/2004 | Donnelly et al. | 700/22 |
| 2005/0103615 A1 | 5/2005 | Ritchey | |
| 2005/0200205 A1 * | 9/2005 | Winn et al. | 307/64 |
| 2006/0049694 A1 * | 3/2006 | Kates | 307/132 E |
| 2006/0061213 A1 * | 3/2006 | Michalko | 307/9.1 |
| 2006/0092588 A1 * | 5/2006 | Realmuto et al. | 361/62 |
| 2006/0158037 A1 * | 7/2006 | Danley et al. | 307/64 |
| 2006/0288720 A1 | 12/2006 | Jmaev | |
| 2007/0013194 A1 * | 1/2007 | Calley | 290/44 |
| 2007/0089444 A1 | 4/2007 | Chen | |
| 2007/0135970 A1 * | 6/2007 | Zhou et al. | 700/286 |
| 2007/0290651 A1 * | 12/2007 | McNulty et al. | 318/800 |
| 2008/0000247 A1 | 1/2008 | Sinha et al. | |
| 2008/0046387 A1 * | 2/2008 | Gopal et al. | 705/412 |
| 2009/0058191 A1 * | 3/2009 | Nordman et al. | 307/112 |
| 2009/0063228 A1 * | 3/2009 | Forbes, Jr. | 705/7 |
| 2009/0190279 A1 * | 7/2009 | Rusan et al. | 361/93.6 |
| 2010/0188869 A1 * | 7/2010 | Fredette et al. | 363/15 |
| 2010/0263660 A1 * | 10/2010 | Thorne | 126/601 |
| 2011/0005567 A1 * | 1/2011 | VanderSluis et al. | 136/244 |

FOREIGN PATENT DOCUMENTS

| | | |
|---|---|---|
| JP | 3225152 B2 | 11/2001 |
| JP | 2003204682 A | 7/2003 |

OTHER PUBLICATIONS

Foreign Communication From A Related Counterpart Application, Chinese Application No. 2010105034646, First Chinese Office Action dated Feb. 8, 2014, 12 pages.

* cited by examiner

UTILITY-INTERACTIVE INVERTER SYSTEM ARCHITECTURE AND METHOD OF OPERATION THEREOF

CROSS-REFERENCE TO RELATED APPLICATION

This application claims the benefit of U.S. Provisional Application Ser. No. 61/224,530, filed by Brizendine, et al., on Jul. 10, 2009, entitled "Grid-Tied Renewable Energy HVAC Equipment," and U.S. Provisional Application Ser. No. 61/250,736, filed by Manohar, et al., on Oct. 12, 2009, entitled "SunSource™ Heat Pump." This application is also a continuation-in-part of U.S. patent application Ser. No. 12/186,132, filed by Uselton on Aug. 5, 2008, entitled "Dual-Powered Airflow Generator." All three of these applications are commonly assigned and incorporated herein by reference.

TECHNICAL FIELD

This application is directed, in general, to electric power systems and, more specifically, to a utility-interactive inverter system architecture and method of operation thereof.

BACKGROUND

Mainstream media has extensively covered efforts to reduce reliance on fossil and nuclear fuels in favor of so-called renewable energy, chief among these being solar and wind energy. Residential and business electric power customers have taken steps to reduce their dependence on the commercial electric power distribution network (commonly called "the grid") and the electric power utilities that sell electric power through it.

The customers reduce net energy draw not only by reducing consumption by, for example, increasing thermal insulation, selecting more energy-efficient equipment (e.g., appliances) and using it more judiciously, but also by drawing at least some of the electric power they need from renewable-energy power sources, including windmills and photovoltaic ("solar") panels, they have installed on their own premises. Relatively few of these customers derive enough electric power from these premises power sources to go "off the grid." Instead, most customers remain "on the grid," using the premises power sources as much as possible and drawing the remaining electric power they need from the grid.

Most states have passed laws permitting distributed generation (DG), colloquially known as "grid-tying." DG is the coupling of premises power sources to the existing power grid such that the sources can synchronize with, and supply power to, the grid. To compensate customers having these sources for the power they provide to the grid, states have also passed laws that enable "net-billing" or "net-metering." Net-billing employs a second electric meter, separate from the usual one that measures power a customer takes from the grid, that measures the power that the customer's premises power sources supply to the grid. Net-metering uses a single, bidirectional electric meter that keeps track of net power flow to or from the grid.

SUMMARY

One aspect provides electrically powered equipment. In one embodiment, the equipment includes: (1) an electric power consuming apparatus, (2) a mains input coupled to the apparatus and configured to be coupled to a branch circuit extending from a distribution panel and allow electric power from the branch circuit to flow to the apparatus and (3) a grid-tied power source input at least intermittently couplable to the mains input and configured to receive electric power from at least one premises power source and allow the electric power to flow to the apparatus or the distribution panel. "Or" is used inclusively herein, meaning in the context of the preceding sentence that the premises power source may be sized relative to the apparatus such that the electric power may sometimes flow to both the apparatus and the distribution panel.

Another aspect provides a method of powering electrically powered equipment. In one aspect, the method includes: (1) at least intermittently providing electric power to an electric power consuming apparatus in the equipment via a mains input thereof and a branch circuit extending from a distribution panel and coupled to the mains input, (2) at least intermittently providing electric power from the grid-tied power source input to the electric power consuming apparatus and (3) at least intermittently providing electric power from the grid-tied power source input to the distribution panel via the mains input and the branch circuit.

Yet another aspect provides an outdoor unit. In one embodiment, the unit includes: (1) a motor, (2) a mains input coupled to the motor and configured to be coupled to a branch circuit extending from a distribution panel and allow electric power from the branch circuit to flow to the motor and (3) a grid-tied power source input at least intermittently couplable to the mains input and configured to receive electric power from at least one premises power source and allow the electric power to flow to the motor or the distribution panel.

BRIEF DESCRIPTION

Reference is now made to the following descriptions taken in conjunction with the accompanying drawings, in which.

DETAILED DESCRIPTION

As stated above, an ever-growing number of residential and business electric power customers have taken steps to reduce their dependence on the grid and electric power utilities by taking advantage of grid-tying. However, the National Electric Code, which dictates local electrical codes and standard practice in the industry, currently accommodates only grid-tying directly into the distribution panel. Accordingly, those customers wanting to "grid-tie" their premises power sources (e.g., windmills, solar modules or other sources) are urged to install a dedicated grid-tie bus leading from their premises power sources to their distribution panels. Unfortunately, distribution panels are almost universally located in the interior of buildings, and perhaps on an interior wall. As a result, installing a suitable dedicated grid-tie bus involves substantial cost and effort that, as a result, discourages customers from taking advantage of renewable sources of energy and potential freedom from high electric bills.

It is realized herein that the National Electric Code's provision for grid-tying at distribution panels, while widely accepted, is an artificial constraint, and that other techniques for grid-tying are not only possible but may be highly advantageous for many applications. Accordingly, introduced herein is a utility-interactive inverter system architecture in which grid-tying takes place at one or more pieces of electrically powered equipment that are coupled to a distribution panel by one or more branch circuits, which may be dedicated branch circuits. The novel architecture is based at least in part on the realization that the branch circuits can perform the task of routing electric power to the distribution panel and that a bus need only be installed between the one or more premises power sources to one or more electrically powered equipment.

Figure 1:
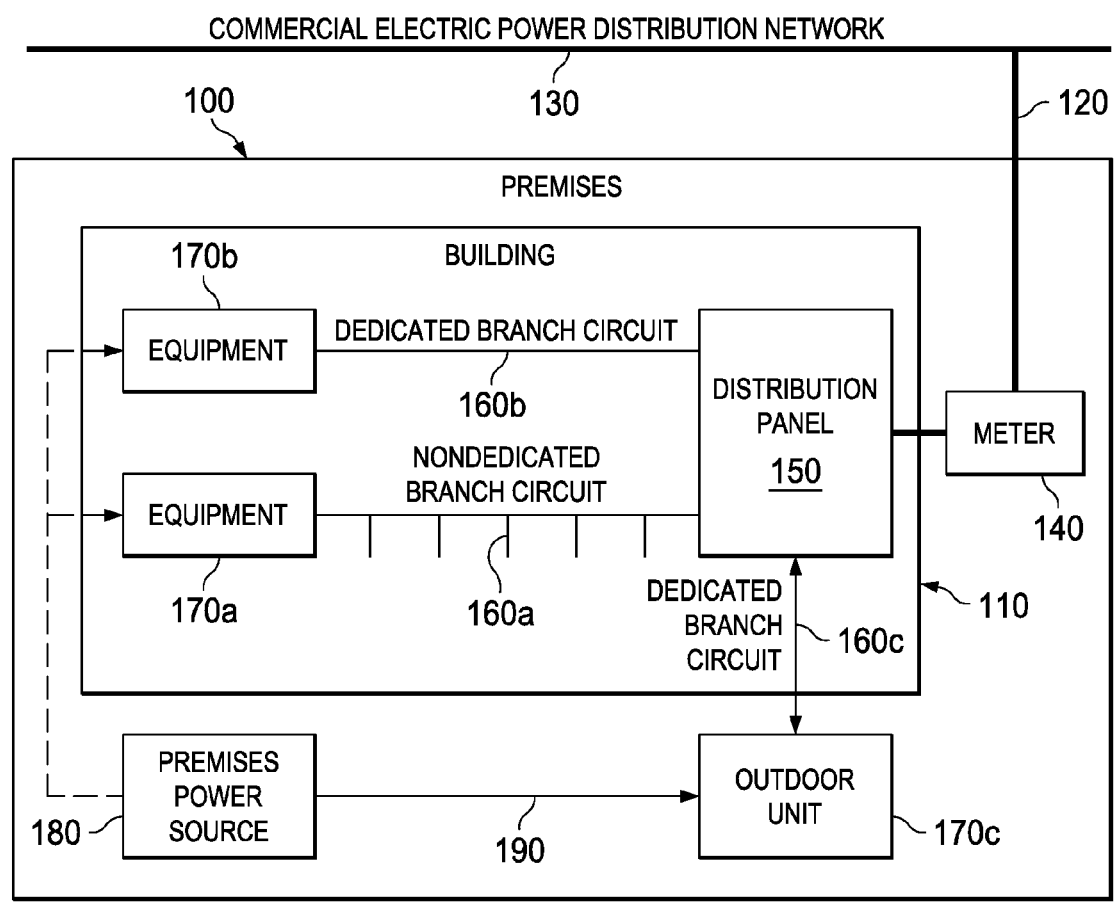
FIG. 1 is a high-level schematic diagram of one embodiment of an electric power system associated with an example premises and coupled to the grid.

FIG. 1 is a high-level schematic diagram of one embodiment of an electric power system associated with an example premises and coupled to the grid. FIG. 1 shows a premises 100. The premises 100 may be land and a building 110 sitting on the land. The building 110 may be a residence, for example a single-family or multi-family residence, an apartment or condominium complex, a commune, a subdivision, a gated community, a master-planned community, a retirement or nursing home or village, a trailer park, a recreational vehicle park or any place where people may live of any conventional or later-developed type. The building 110 may alternatively or additionally be a business, for example a standalone retail or office building, a strip or enclosed mall, a restaurant, a factory, a museum, a warehouse, a hotel, a motel, a resort or a lodge or any place where people may work or play of any other conventional or later-developed type.

A branch 120 of a commercial electric power distribution network 130 (commonly known as the "grid") enters the premises 100 and couples to an electric power meter 140, illustrated in FIG. 1 as being associated with an outer wall of the building 110. A distribution panel 150 is located within the building 110 and coupled to the meter 140. Those skilled in the pertinent art will understand that the meter 140 and the distribution panel 150 may be located anywhere with respect to the building 110 and, indeed, the premises 100 as a whole.

The distribution panel 150 serves as a hub of a premises electric power system. Included in the premises electric power system are several branch circuits that FIG. 1 shows as extending from the distribution panel 150 and around the building 110 and the premises 100. For example, a nondedicated branch circuit 160a extends to a plurality of unreferenced loads (e.g., outlets or lights), indicated by a plurality of unreferenced lines) and a first piece of electrically powered equipment 170a. A dedicated branch circuit 160b extends to a single load, i.e., a second piece of electrically powered equipment 170b. A dedicated branch circuit 160c extends to another single load, i.e., an outdoor unit 170c that forms at least part of an air conditioning system or a heat pump climate control system. For purposes of this description, a dedicated branch circuit is a branch circuit that extends and provides power to a single load, and a nondedicated branch circuit is designed to provide power to more than one load, even though no loads or one load may be coupled to it at certain times. Those skilled in the pertinent art are also aware that outdoor units (which are often located on the ground adjacent to, or the rooftop of, a building) are employed to exchange heat between a closed-circuit coolant loop and the ambient environment to heat or cool coolant flowing through (e.g., hydrofluorocarbon fluid) in the coolant loop.

For purposes of this description, electrically powered equipment is an electrical load of any type, including resistive and reactive loads, and includes all manner of equipment and appliances that may be electrically powered. Specific examples given herein subsume all manner of climate control equipment, including HVAC equipment, heat pump equipment, desiccating equipment and evaporative cooling equipment. However, those skilled in the pertinent art will understand that the teachings herein apply to all manner of electrical load without limitation.

A bus 190 electrically couples a premises power source 180 to the outdoor unit 170c. The premises power source 180 may be any source of electrical power (e.g., a windmill, a photovoltaic cell, panel or array, a fuel cell, a battery, a geothermal generator, a hydroelectric generator or any other conventional or later-developed or discovered electrical power source) that is located on the premises 100. The premises power source 180 may produce DC or AC power. Accordingly, the bus 190 may be a DC bus or an AC bus of any appropriate voltage or current capacity. In alternative embodiments, the premises power source 180 produces AC power, produces DC power but then converts the DC power to AC power before transmitting the power along the bus 190 or produces and transmits DC power along the bus 190 for conversion at an intermediate location or a distal end of the bus 190 (the end proximate the outdoor unit 170c or, in alternative embodiments, the first or second pieces of electrically powered equipment 170a, 170b).

Two general embodiments will now be described. In a first embodiment, equipment can use power from two sources: AC power from the electric utility and renewable power from solar photovoltaic modules. As will be shown, a utility-interactive inverter becomes the bridge for conversion of DC power (from a premises power source) to AC power used by, for example, a compressor, fan motor or other loads in equipment. The output side of the utility-interactive inverter is connected to the "line" side of the equipment contactor (a power relay). Thus connected, the utility-interactive inverter can sense the voltage and phase of the utility provided AC power to synchronize with it. As the compressor or other loads consume power, the amount taken from the electric utility source may then be decreased by the amount of renewable energy that is produced and converted by the utility-interactive inverter. When the compressor and other loads cycle off, the utility-interactive inverter is still connected to the electric grid via the branch circuit of the equipment. The equipment therefore becomes a generation source for running other loads in the building. If the generation capability of the renewable energy system exceeds the loads in the house or building, the power will be exported out to the utility grid. The power meter on the building then "turns backwards."

Figure 2:
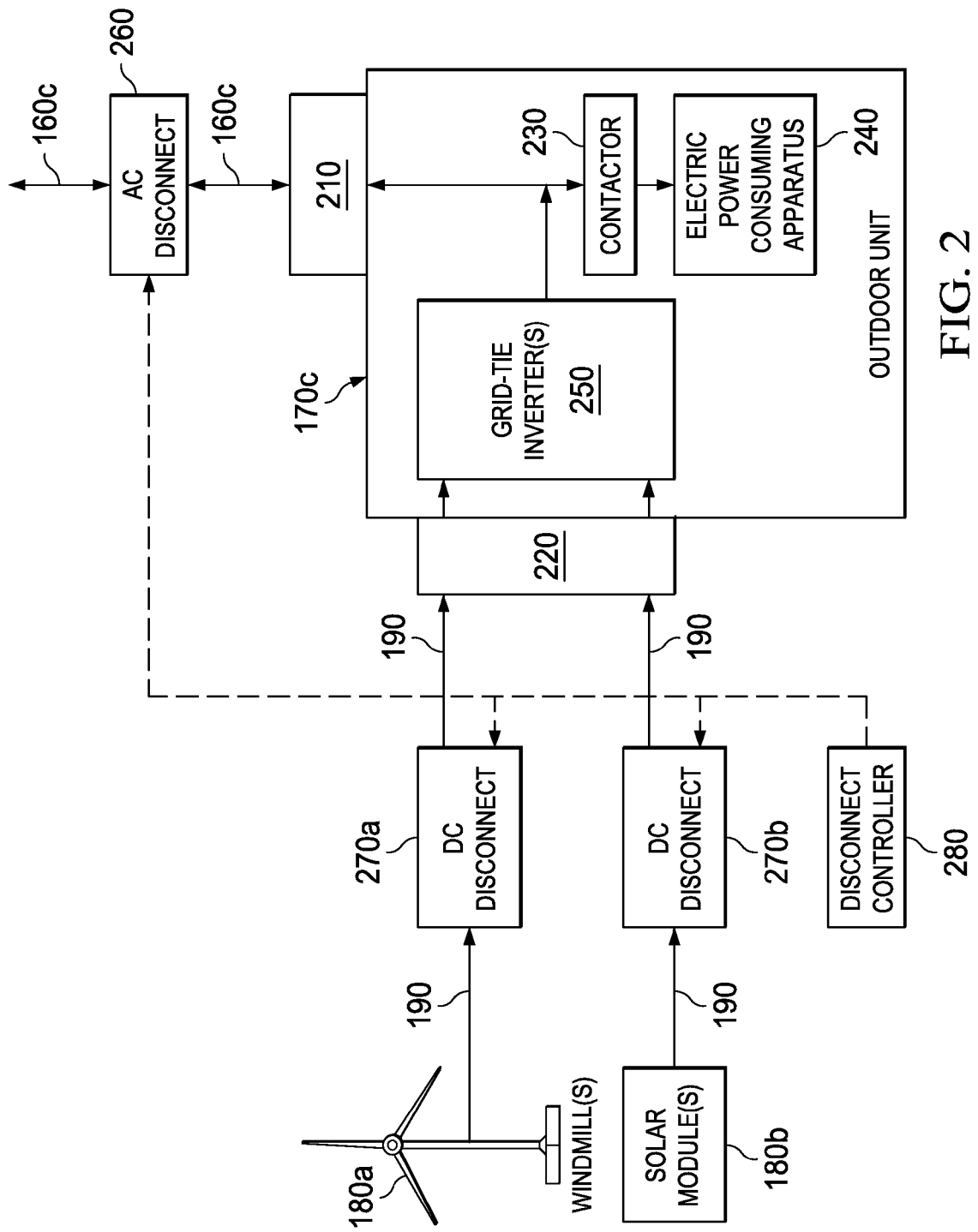
FIG. 2 is a block diagram of one embodiment of electrically powered equipment that may be coupled to a premises electric power system via a branch circuit thereof.

FIG. 2 is a block diagram of one embodiment of electrically powered equipment that may be coupled to a premises electric power system via a branch circuit thereof. In the embodiment of FIG. 2, the electrically powered equipment is or includes the outdoor unit 170c of FIG. 1, and the branch circuit is or includes the dedicated branch circuit 160c of FIG. 1. The electric power may be single-phase or three-phase.

The outdoor unit 170c includes an electric power consuming apparatus 240. That apparatus 240 may be a load of any type. In the embodiment of FIG. 2, the apparatus 240 is a fan motor. The outdoor unit 170 further includes a mains input 210 and a grid-tied power source input 220. The mains input 210 is coupled to the apparatus 240 and configured to be coupled to the branch circuit 160c extending from a distribution panel (e.g., the distribution panel 150 of FIG. 1). So coupled, the mains input 210 allows electric power to flow from the branch circuit 160c to the apparatus 240 to energize and operate the same. The mains input 210 may be located in or on a common housing with other parts of the outdoor unit or located in an associated junction box or breaker box. A contactor 230 can turn the apparatus 240 on or off, perhaps in response to commands from an outdoor unit controller (not shown).

The grid-tied power source input 220 is at least intermittently couplable to the mains input 210 and configured to receive electric power from at least one premises power source, e.g., one or more windmills 180a, one or more solar modules 180b or other or further premises power sources not shown in FIG. 2 via buses 190. The grid-tied power source input 220 may be located in or on a common housing with other parts of the outdoor unit or located in an associated junction box or breaker box. In the embodiment of FIG. 2, the grid-tied power source input 220 includes a receptacle (not shown) accessible from without (outside of) the outdoor unit 170c. The receptacle, if present, allows at least one premises power source to be plugged in to, and unplugged from, the outdoor unit 170c.

The grid-tied power source input 220 allows the electric power provided from the at least one premises power source to flow to the apparatus 240 or the distribution panel (not shown in FIG. 2). In the embodiment of FIG. 2, the electric power provided from the at least one premises power source flows to the apparatus 240 to the extent that the apparatus 240 requires power, and electric power provided from the at least one premises power source flows to the distribution panel to the extent that the power output of the at least one premises power source exceeds the power requirements of the apparatus 240.

In the embodiment of FIG. 2, the outdoor unit 170c further includes a disconnect 270a. The disconnect 270a is controllable to close based on a status of at least one of the at least one premises power source, namely the one or more windmills 180a. In the embodiment of FIG. 2, the disconnect 270a is a DC disconnect, because the one or more windmills 180a produce DC electric power. The embodiment of FIG. 2 also includes a disconnect 270b. Like the disconnect 270a, the disconnect 270b is controllable to close based on a status of at least one of the at least one premises power source, namely the one or more solar modules 180b. In the embodiment of FIG. 2, the disconnect 270a is a DC disconnect, because the one or more windmills 180a produce DC electric power. The embodiment of FIG. 2 further includes an AC disconnect 260. The disconnect 270b is controllable to open when it is desired to isolate the outdoor unit 170c from the distribution panel (not shown in FIG. 2).

The embodiment of FIG. 2 includes a disconnect controller 280 configured to provide signals to control the disconnects 260, 270a, 270b as appropriate. In the embodiment of FIG. 2, the disconnect controller 260 causes the AC disconnect 260 to open only when it is desired to decouple the outdoor unit 170c from the distribution panel and causes the DC disconnects 270a, 270b to open when their associated premises power sources are faulty, are producing insufficient or poor-quality electric power or are not coupled to the bus 190. In an alternative embodiment, the disconnects 260, 270a, 270b are manual disconnects, and no disconnect controller is needed. In an alternative embodiment, the one or more utility-interactive inverters 250 include internal disconnects, which may be DC or AC disconnects depending upon whether they are associated with inverter inputs or outputs. The internal disconnects, if present, may have their own controllers. If the one or more utility-interactive inverters 250 include disconnects, the DC disconnects 270a, 270b may be omitted.

Because the illustrated premises power sources (namely the one or more windmills 180a and the one or more solar modules 180b) provide DC power, a utility-interactive inverter 250 having an input coupled to the grid-tied power source input 220 and an output coupled to the mains input 210 is employed to convert the DC power to AC power. In the embodiment of FIG. 2, the utility-interactive inverter 250 includes one or more micro-inverters.

Over the past fifteen years, progress has been made in the field of small-scale utility inter-tie systems. The Institute of Electrical and Electronics Engineers (IEEE) and Underwriters Laboratories, Inc. (UL) have developed safety standards for utility interactive inverters that can take DC power from renewable energy sources and feed it back to the electric utility grid as compatible, synchronized AC power. In the past ten years, practical utility-interactive inverters rated at a few kilowatts have become popular for solar photovoltaic power systems for homes and businesses. In the last eighteen months, this technology has been miniaturized down below one kilowatt in power, yielding so-called "micro-inverters." This new technology at least in part enables the creation of electrically powered equipment that can be powered by renewable energy and can be a net exporter of power to the home or business when more renewable power is being generated than is needed to operate the equipment.

The embodiment of FIG. 2 is particularly advantageous for applications employing one or a few premises power sources. If the DC power provided by each solar module is below 50 volts, the National Electric Code does not as stringently govern wiring conventions. When multiple premises power sources are used, an equal number of utility-interactive inverters may be used, and buses would be used to connect each premises power source to each inverter. The output side of the utility-interactive inverters then may combine together, causing the current to sum together for delivery to the "line" terminals of the equipment.

Figure 3:
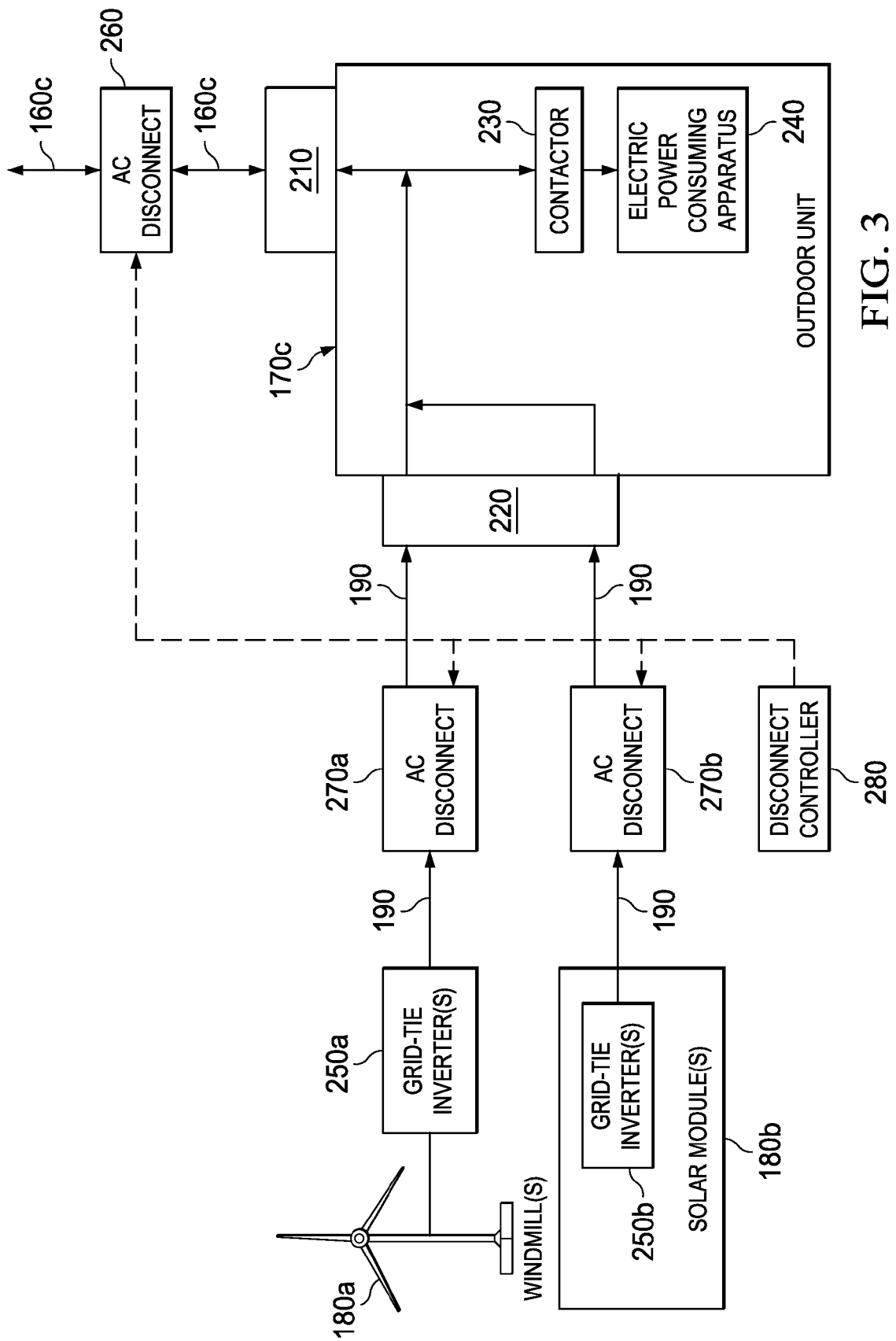
FIG. 3 is a block diagram of one embodiment of electrically powered equipment that may be coupled to a premises electric power system via a branch circuit thereof.

Equipment configured according to FIG. 2 could be field-converted to the embodiment of FIG. 3. This would happen in the event that someone wants to use more than a few solar modules—possibly increasing the solar power generation capacity over time. In the embodiment of FIG. 3, the utility-interactive inverters are external to the equipment, and the output of the utility-interactive inverters is provided to the equipment through a secondary power entry point. This embodiment may be advantageous relative to the first when there are more than a few solar modules and inverters. The reason is that inverter output is at high voltage and the conductor size can be smaller to transmit the same amount of power. The current outputs of the utility-interactive inverters are combined and only one pair of high voltage AC conductors is needed to bring this power to the secondary power entry point of the equipment. The same argument applies, as above, with regard to protection of the buses. All that needs to be specified is the maximum size premises power source that is suitable for use with the equipment.

FIG. 3 is a block diagram of one embodiment of electrically powered equipment that may be coupled to a premises electric power system via a branch circuit thereof. The embodiment of FIG. 3 differs from that of FIG. 2 in at least one regard, namely that the utility-interactive inverters 250 of FIG. 2 are now associated with respective ones of the premises power sources. More specifically, one or more utility-interactive inverters 250a are located proximate, and perhaps integral with, the one or more windmills 180a. Likewise, one or more utility-interactive inverters 250b are located proximate, and perhaps integral with, the one or more solar modules 180b. In the embodiment of FIG. 3, the utility-interactive inverters 250a, 250b are micro-inverters.

FIG. 3 also shows that the disconnects 270a, 270b are AC disconnects since the electric power that they control is AC power. In one embodiment, the AC disconnects 260, 270a, 270b are manual disconnects, and no disconnect controller is needed. In a further alternative embodiment, the one or more utility-interactive inverters 250a, 250b include internal disconnects, which may be DC or AC disconnects depending upon whether they are associated with inverter inputs or outputs. The internal disconnects, if present, may have their own controllers. If the one or more utility-interactive inverters 250 include disconnects, the AC disconnects 270a, 270b may be omitted. Finally, FIG. 3 shows that the grid-tied power source input 220 is directly coupled to the mains input 210. One or more switches (not shown) may interpose the grid-tied power source input 220 and the mains input 210, but they are outside the scope of this description.

In one embodiment, the sum of the output currents of the utility-interactive inverters is less than the current carrying capacity of the branch circuit conductors used to supply the equipment, ensuring that the branch circuit remains safe. For example, when the one or more premises power sources produce no power, the branch circuit conductors have been appropriately sized to operate the equipment. When the one or more premises power sources produce more power than the equipment requires, the branch circuit conductors have been appropriately sized to handle the return power. When the one or more premises power sources produce less power than the equipment requires, the power flowing through the branch circuit conductors is equal to the difference between the current needed by the equipment and the current produced by the solar power system, which is less than the design capacity of the branch circuit conductors.

In various embodiments, the performance and reporting diagnostic capabilities of some of these utility-interactive inverters may be linked to commercial and residential communicating networks associated with the equipment (e.g., the outdoor unit). The performance of each of the premises power sources could be reported, on a real-time basis, to a display, e.g., a thermostat/display unit in a building energy management computer. Linking back to the Internet through a wireline or wireless connection may enable remote performance monitoring that utilities and governments desire when they are financially involved in renewable energy installations.

Figure 4:
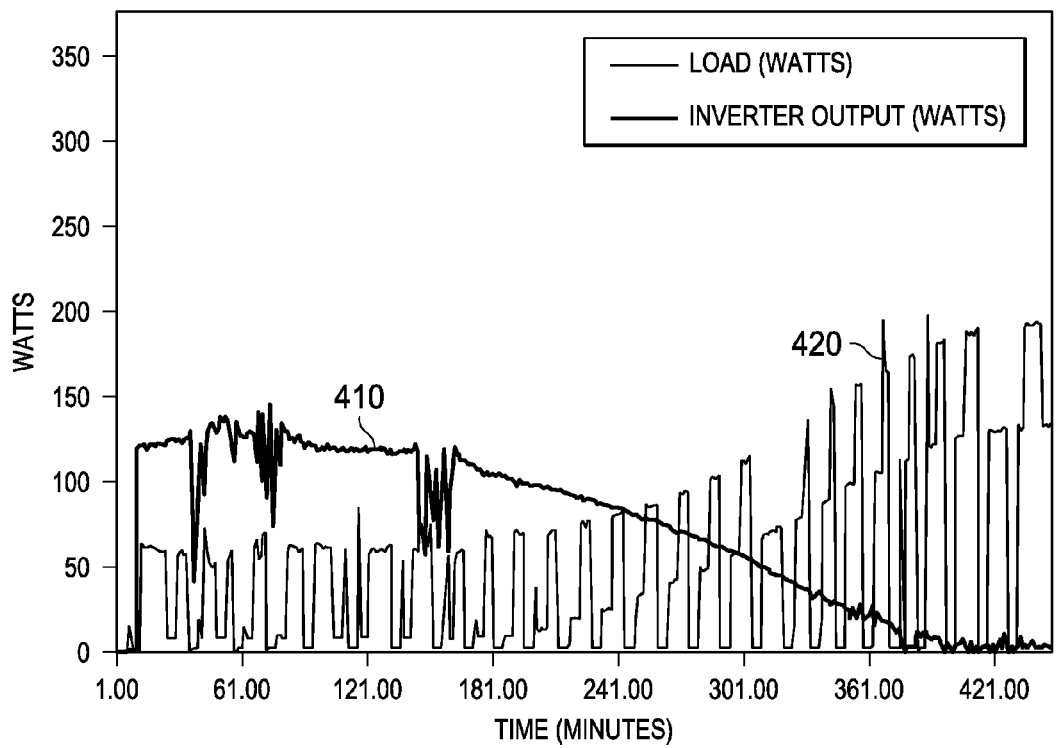
FIG. 4 is a graph showing inverter output over time.

FIG. 4 is a graph showing inverter output 410 and electric power consuming apparatus power requirements 420 over time for an example in which the electrically powered equipments is the outdoor unit of an HVAC system and the premises power source includes a solar module. Of course, FIG. 4 is only one example of many that could be given.

FIG. 4 demonstrates that there are times during which the output 410 exceeds the requirements 420. During this time, net electric power can flow from the electrically powered equipment (e.g., outdoor unit) back to the distribution panel and the grid as a whole. As stated above, this flow back to the grid is achieved without having to provide a separate bus directly from the premises power source to the distribution panel. At other times, the requirements 420 exceed the output 410, at which time net electric power can flow from the grid as a whole through the distribution panel and to the electrically powered equipment.

Figure 5:
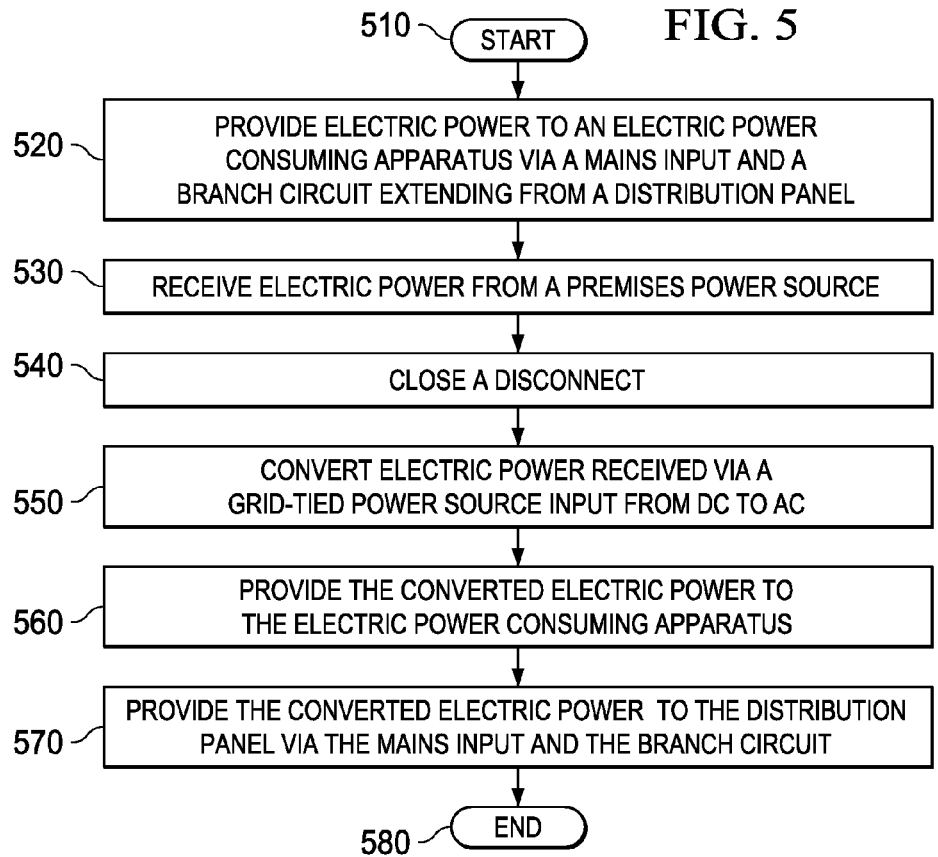
FIG. 5 is a flow diagram of one embodiment of a method of powering electrically powered equipment.

FIG. 5 is a flow diagram of one embodiment of a method of powering electrically powered equipment. The method begins in a start step 510. In a step 520, electric power is provided to an electric power consuming apparatus via a mains input and a branch circuit extending from a distribution panel. In a step 530, electric power is received from a premises power source. In a step 540, a disconnect is closed to allow the electric power to flow from the premises power source to a grid-tied power source input. In a step 550, the electric power received via the grid-tied power source input is converted from DC to AC. In a step 560, the converted electric power is provided to the electric power consuming apparatus to the extent that the apparatus requires power. In a step 570, the excess converted electric power is provided to the distribution panel via the mains input and the branch circuit. The method ends in an end step 580.

Those skilled in the art to which this application relates will appreciate that other and further additions, deletions, substitutions and modifications may be made to the described embodiments.

What is claimed is:

1. An electrical power system for transmitting electrical power to and from a distribution panel using a branch circuit, the system comprising:
   at least one premises power source;
   a commercial electric power source on a grid,
   an electrically-powered equipment having a least a portion located outdoors, wherein the electrically-powered equipment comprises climate control equipment, the electrically-powered equipment comprising:
   an apparatus that consumes electrical power,
   a mains input electrically-coupled to the commercial electric power source via the distribution panel, the mains input configured to receive electrical power from or supply electrical power to the grid via the branch circuit and distribution panel,
   a grid-tied power source input electrically-coupled to the premises power source and the mains input, the grid-tied power source input configured to receive electrical power from the premises power source, and
   wherein the electrically-powered equipment is configured to output electrical power from the mains input when electrical power received by the grid-tied power source input exceeds a power requirement of the apparatus.

2. The system of claim 1, wherein the electrically-powered equipment further comprises a utility-interactive inverter having an input and an output, the input configured to receive direct-current power from the grid-tied power source input, the output configured to supply alternating-current power.

3. The system of claim 1, further comprising a controllable disconnect, the controllable disconnect configured to close based on a status of at least one of the at least one premises power source.

4. The system of claim 1, wherein the at least one premises power source is configured to convert renewable energy into electrical power.

5. The system of claim 1, further comprising:
   an external utility-interactive inverter located proximate the at least one premises power source and associated therewith;
   wherein the at least one premises power source is configured to convert renewable energy into electrical power;
   wherein the external utility-interactive inverter is configured to receive direct-current power from the at least one premises power source; and
   wherein the external utility-interactive inverter is configured to supply alternating-current power to the grid-tied power source input.

6. The system of claim 1, further comprising:
   wherein the at least one premises power source is configured to convert renewable energy into electrical power; and wherein the at least one premises power source is electrically-coupled to the grid-tied power source input via a direct-current bus.

7. The system of claim 1, further comprising:
wherein the at least one premises power source is configured to convert renewable energy into electrical power;
wherein the at least one premises power source is electrically-coupled to the grid-tied power source input via an alternating-current bus; and
wherein the at least one premises power source is configured to produce direct-current power and convert direct-current power so-produced into alternating-current power for transmission along the alternating-current bus.

8. The system of claim 4, wherein the at least one premises power source converts solar energy into electrical power.

9. The system of claim 4, wherein the at least one premises power source converts wind energy into electrical power.

10. A method for transmitting electrical power to and from a distribution panel using a branch circuit, the method comprising:
using a mains input of an electrically-powered equipment to receive electrical power;
receiving electrical power from at least one premises power source at a grid-tied power source input of the electrically-powered equipment;
providing electrical power to an apparatus of the electrically-powered equipment;
supplying electrical power to the branch circuit when electrical power received by the grid-tied power source input exceeds an amount required by the apparatus; and
wherein the at least one premises power source converts renewable energy into electrical power.

11. The method of claim 10, wherein the step of receiving electrical power from the at least one premises power source comprises closing a controllable disconnect to allow electrical power to flow from the premises power source to the grid-tied power source input of the electrically-powered equipment.

12. The method of claim 10, wherein the at least one premises power source produces direct current power and the grid-tied power source input converts direct-current electrical power received from the at least one premises power source into alternating-current power.

13. The method of claim 10, wherein the apparatus comprises a motor of a climate-control system.

14. The method of claim 10, wherein the at least one premises power source converts solar energy into electrical power.

15. The method of claim 10, wherein the at least one premises power source converts wind energy into electrical power.

16. An outdoor system for transmitting electrical power to and from a distribution panel using a branch circuit, the outdoor system comprising:
an electrically-powered equipment having a least a portion located outdoors, the electrically-powered equipment comprising:
a motor configured to perform work on fluid in a climate-control system,
a mains input electrically-coupled to the motor, the mains input configured to receive electrical power from and supply electrical power to the branch circuit,
a grid-tied power source input electrically-coupled to the mains input and the motor, the grid-tied power source configured to receive electrical power from at least one premises power source, and
wherein the electrically-powered equipment is configured to output electrical power from the mains input when electrical power received by the grid-tied power source input exceeds a power requirement of the motor.

17. The outdoor system of claim 16, wherein the electrically-powered equipment further comprises a utility-interactive inverter having an input and an output, the input configured to receive direct-current power from the grid-tied power source input, the output configured to supply alternating-current power.

18. The outdoor system of claim 16, further comprising a controllable disconnect, the controllable disconnect configured to close based on a status of at least one of the at least one premises power source.

* * * * *